United States Patent [19]
Koyanagi

[11] Patent Number: 6,144,813
[45] Date of Patent: Nov. 7, 2000

[54] IMAGE FORMING APPARATUS PROVIDED WITH CONVEYING PATH CHANGEOVER DEVICE

[75] Inventor: Noriaki Koyanagi, Shizuoka-ken, Japan

[73] Assignee: Canon Kabushiki Kaisha, Tokyo, Japan

[21] Appl. No.: 09/343,083

[22] Filed: Jun. 30, 1999

[30] Foreign Application Priority Data

Jul. 6, 1998 [JP] Japan ................................. 10-205895

[51] Int. Cl.⁷ .................................................. G03G 15/00
[52] U.S. Cl. ......................... 399/13; 358/474; 399/118; 399/377
[58] Field of Search .................................. 399/12, 13, 16, 399/17, 107, 110, 118, 377, 379, 380; 358/474, 496, 498

[56] References Cited

U.S. PATENT DOCUMENTS

| | | | |
|---|---|---|---|
| 5,751,431 | 5/1998 | Taka et al. | 399/110 X |
| 5,884,117 | 3/1999 | Tanoue et al. | 399/110 X |

*Primary Examiner*—William J. Royer
*Attorney, Agent, or Firm*—Fitzpatrick, Cella, Harper & Scinto

[57] ABSTRACT

An image forming apparatus including a sheet feeding device, an image forming device for forming an image on a sheet fed, a plurality of conveying paths for directing the sheet on which the image has been formed to discharging portions, a changeover device for selecting a desired conveying path from the plurality of conveying paths and a changeover controlling device for controlling the changeover device in conformity with whether a reading device for reading the image of an original has been set at a predetermined position in a body of the apparatus.

17 Claims, 8 Drawing Sheets

IMAGE FORMING APPARATUS PROVIDED WITH CONVEYING PATH CHANGEOVER DEVICE

BACKGROUND OF THE INVENTION

1. Field of the Invention

This invention relates to an image forming apparatus such as a copying apparatus, a printer or a facsimile apparatus, and particularly to the technique of making a plurality of conveyance paths capable of being selected in conformity with the disposed state of a separable image reading portion.

2. Related Background Art

As a conventional image forming apparatus, the construction of an ordinary copying apparatus is shown in FIG. 8 of the accompanying drawings. In an image reading portion R, the image of an original placed on platen glass 1 is directed to a CCD 3 by an optical reading system 2 comprising an illuminating lamp, a reflecting mirror, and a lens and is converted into an electrical signal.

On the basis of this electrical signal, in an image forming portion P, a laser beam is applied to a photosensitive drum 4 uniformly charged by a primary charger 5, whereby an electrostatic latent image is formed. This electrostatic latent image is visualized into a toner image by a toner supplied from a developing device 6.

On the other hand, a sheet fed by sheet feeding means 7 has its skew feed corrected by its leading end striking against stopped registration rollers 8, and is sent to a transfer portion 9 by the registration rollers 8 being rotated so as to be synchronized with the toner image formed on the photosensitive drum 4.

In the transfer portion 9, the toner image on the photosensitive drum 4 is electrostatically attracted from the back of the sheet by a corona charger or the like, whereby the toner image is transferred onto the sheet.

The sheet onto which the toner image has been transferred has its electrostatic attractive force with respect to the photosensitive drum 4 removed by a separating charger 10, and thereafter is conveyed to a fixing portion 14 by a suction belt conveying portion 11.

The suction belt conveying portion 11 effects the conveyance of the sheet by a rubber belt 13 made of chloroprene while sucking the sheet by are drawn by a fan 12.

The sheet on which the toner image has been fixed by the fixing portion 14 is discharged onto a tray 16 outside the apparatus through a sheet discharging portion 15. Or the sheet is sent to a refeeding conveyance path 17 for both-surface copying or to a post-step such as sorting or stapling.

However, with the digitization of the image forming apparatus, there have been provided many products in which the image reading portion R (reader portion) and the image forming portion P (printer portion) can function as discrete members.

Between a case in which the image forming portion P is made to function as a printer and a case in which the image forming portion P is made to function as a copying apparatus, different processes are carried out in the sheet discharging process.

For example, when the image forming apparatus is used as a printer, a sheet processed as the head page is often discharged with its face down, and when the image forming apparatus is used as a copying apparatus, the sheet is often discharged with its face up, after which the sheets are subjected to a post-process such as stapling.

Which conveyance path is selected depends on a method whereby the installer (service engineer) of the image forming apparatus changes and installs a changeover member or the like in conformity with respective states.

SUMMARY OF THE INVENTION

The present invention has been made in order to solve the above-noted problem which is peculiar to the earlier technology, and the object of the invention is to enable a sheet conveying path to be easily or automatically changed in conformity with the disposed state of an image reading portion to thereby achieve an improvement in the setting work property during the installation or the like of an image forming apparatus.

To achieve the above object, the present invention provides an image forming apparatus including:

sheet feeding means;

image forming means for forming an image on a sheet fed;

a plurality of conveying paths for directing the sheet on which the image has been formed to discharging portions;

changeover means for selecting a desired conveying path from the plurality of conveying paths; and changeover controlling means for controlling the changeover means in conformity with whether reading means for reading the image of an original has been set at a predetermined position in a body of the apparatus.

As described above, according to the present invention, the changeover means changes over the conveying path in conformity with the presence or disposed position of the image reading portion. Accordingly, for example, the conveying path changeover work by a service engineer becomes unnecessary and the setting work property of the image forming apparatus is improved.

Accordingly, when the image forming apparatus is used as a printer in which an image reading portion is not disposed in the upper portion of an image forming portion, a sheet on which an image has been formed can be discharged with its face down, and when the image forming apparatus is used as a copying apparatus, the sheet can be discharged by the mounting of a reader with its face up, and an improvement in the usability of the apparatus can be achieved. Also, the malfunctioning of the apparatus can be prevented. Also, the discharging of the sheet to a sheet containing portion which becomes unuseable upon the mounting of the reader is reliably inhibited, and this is convenient.

DESCRIPTION OF THE PREFERRED EMBODIMENTS

Some embodiments of an image forming apparatus to which the present invention is applied will hereinafter be described in detail with reference to the drawings.

Figure 1:
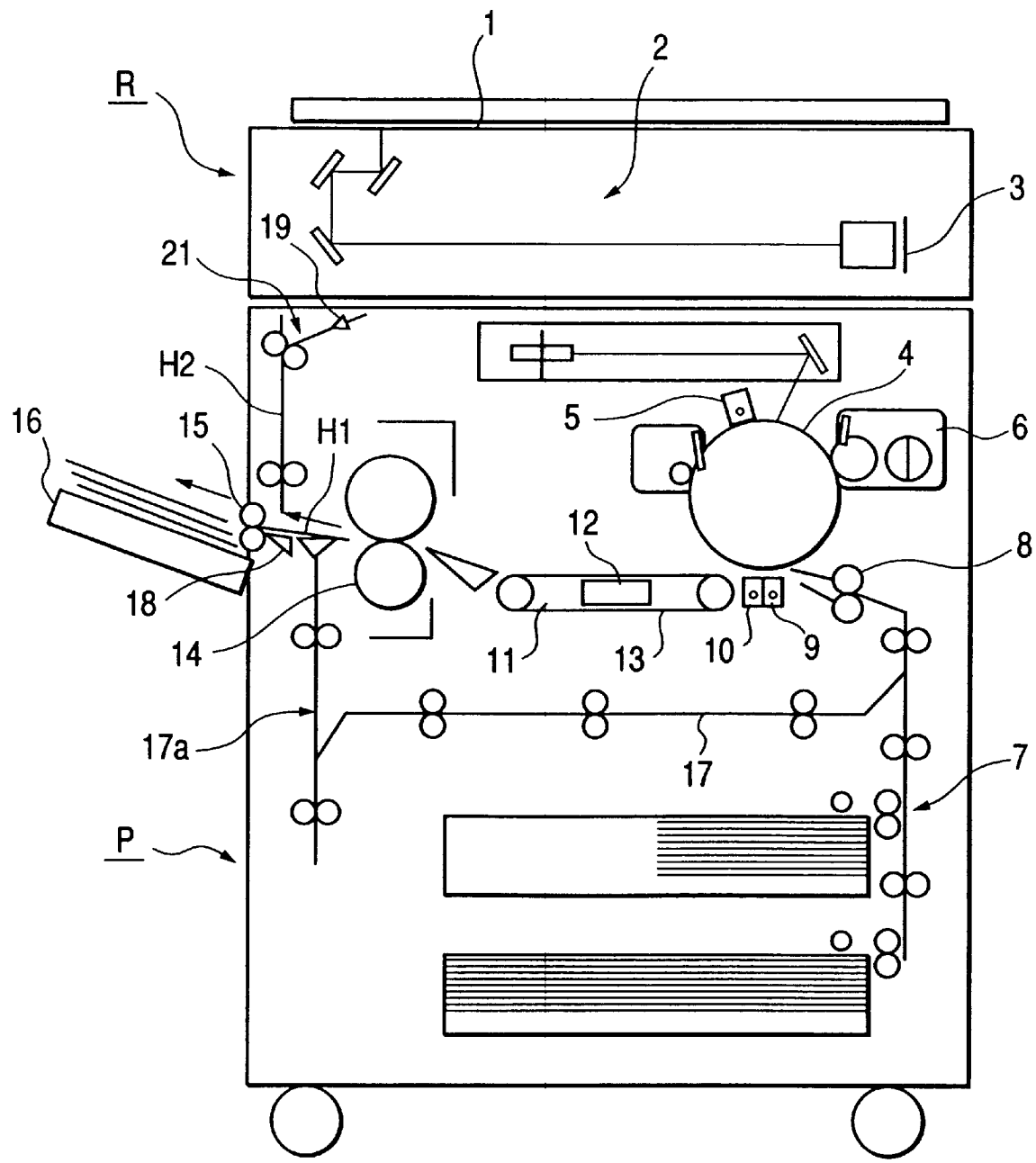
FIG. 1 illustrates an image forming apparatus with reading means according to a first embodiment of the present invention.

In the image reading portion R (reader portion) of FIG. 1, the image of an original placed on a platen glass plate 1 is directed to a CCD 3 by an optical reading system 2 comprising an illuminating lamp, a reflecting mirror and a lens and is converted into an electrical signal.

On the basis of this electrical signal, in an image forming portion P (printer portion), a laser beam is applied to a photosensitive drum 4 uniformly charged by a primary charger 5, whereby an electrostatic latent image is formed. This electrostatic latent image is visualized into a toner image by a toner supplied from a developing device 6.

On the other hand, a sheet fed by sheet feeding means 7 has its leading end striking against stopped registration rollers 8, whereby a skew feed of the sheet is corrected and the sheet is fed to a transfer portion 9 by the registration rollers 8 being rotated so as to be synchronized with the toner image formed on the photosensitive drum 4.

In the transfer portion 9, the toner image on the photosensitive drum 4 is electrostatically attracted from the back side of the sheet by a corona charger or the like and is thereby transferred onto the sheet.

The sheet onto which the toner image has been transferred has its electrostatic attractive force with respect to the photosensitive drum 4 removed by a separating charger 10, and thereafter is conveyed to a fixing portion 14 by a suction belt conveying portion 11.

The suction belt conveying portion 11 effects the conveyance of the sheet by a rubber belt 13 made of chloroprene while sucking the sheet by are drawn by a fan 12.

The sheet having had the toner image thereon fixed by the fixing portion 14 is discharged to a tray 16 outside the apparatus through a sheet discharging portion 15 which is provided on the side portion of the image forming portion P. Or the sheet is sent to a sheet re-feeding conveyance path 17 for both-surface copying or sent to a post-step such as sorting or stapling.

FIG. 1 shows a state in which the image reading portion R is installed at a predetermined position in the image forming portion P. The reference numeral 19 designates detecting means for detecting the image reading portion R, and by this detecting means 19 detecting the image reading portion R, the sheet is conveyed to the sheet discharging portion 15 by changeover means 18 and is discharged onto the sheet discharging tray 16.

When at this time, the sheet is discharged straight from the sheet discharging portion 15, the sheet after image formation is discharged with its image bearing surface facing up. Also, it is possible to reverse (switch back) the front surface and the back surface of the sheet by the vertical conveying path portion 17a of the sheet refeeding conveyance path 17 and discharge the sheet from the sheet discharging portion 15 with its face down.

The changeover means 18 can selectively change over a conveying path H1 for conveying the sheet to the sheet discharging portion 15 and a conveying path H2 for conveying the sheet to a sheet discharging portion 21, by driving means such as a solenoid, not shown. That is, the changeover means 18 can selectively change over a plurality of conveying paths.

Also, the aforedescribed detecting means 19 is capable of detecting the presence or absence of the image reading portion R by a photosensor or the like, but the detecting method is not restricted thereto.

Figure 2:
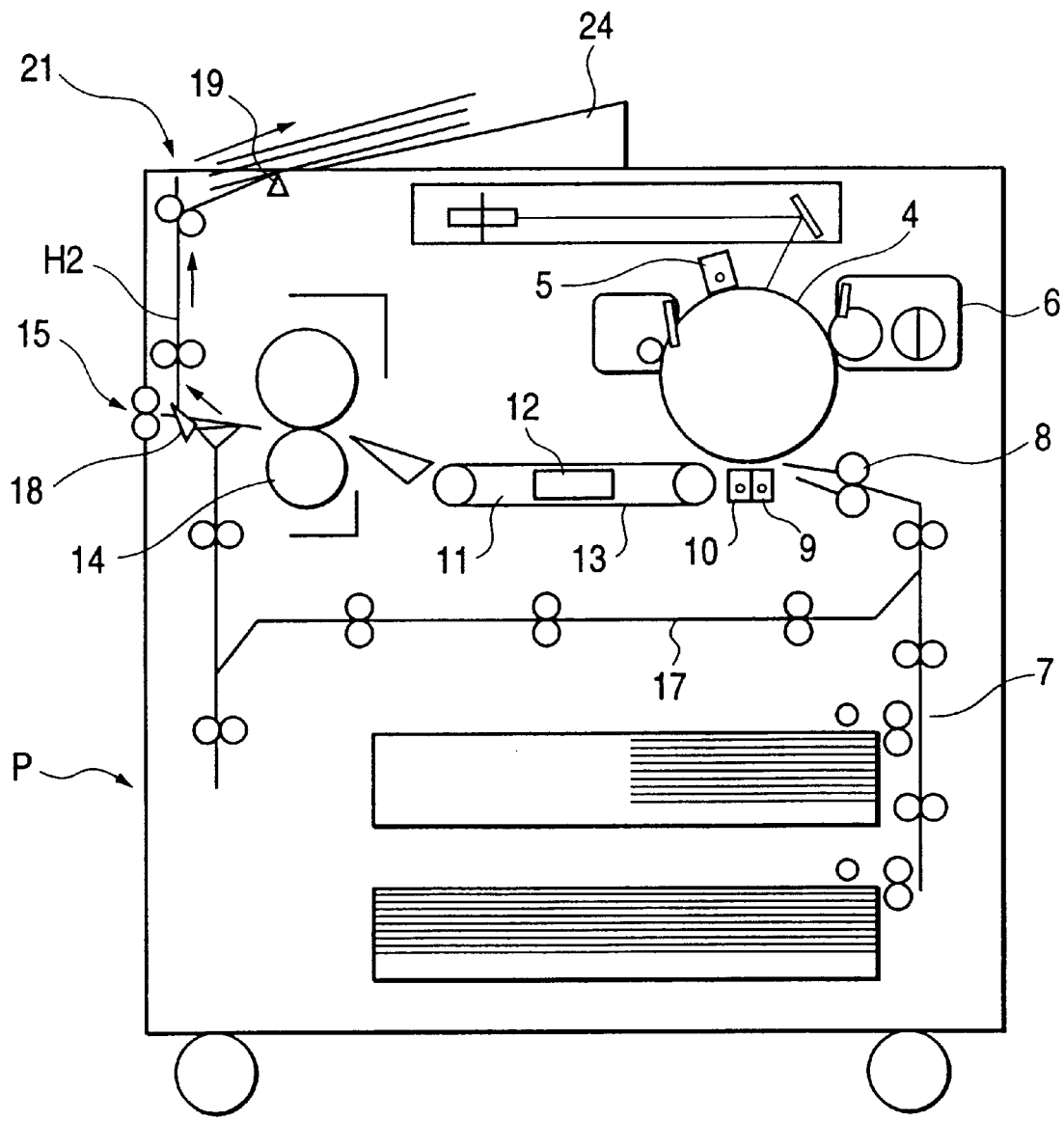
FIG. 2 illustrates the image forming apparatus according to the first embodiment of the present invention.

Next, FIG. 2 shows a state in which the image reading portion R has been removed from the predetermined position in the image forming portion P. At this time, the detecting means 19 detects the absence of the image reading portion R, and control means, not shown, controls the changeover means 18 to thereby change over the sheet conveying path to the sheet discharging conveyance path H2, and the sheet is discharged from the sheet discharging portion 21 which is provided on the upper surface portion of the image forming portion P onto a newly provided sheet discharging tray 24. Also, at this time, an electric signal is inputted to the image forming portion P from the outside so that the image is formed.

In this case, the sheet after image formation is discharged with its image bearing surface facing down.

Accordingly, the detecting means 19 detects the presence or absence of the image reading portion R and in conformity with the detection result, the changeover means 18 automatically changes over the conveying path to the conveying path H1 or the conveying path H2, thus eliminating the conveying path changeover work by a service engineer and improving the setting work property of the image forming apparatus.

[Embodiment 2]

A second embodiment of the image forming apparatus to which the present invention is applied will hereinafter be described in detail with reference to the drawings. In the following description, structural elements similar to those in the first embodiment are given the same reference characters and need not be described.

Figure 3:
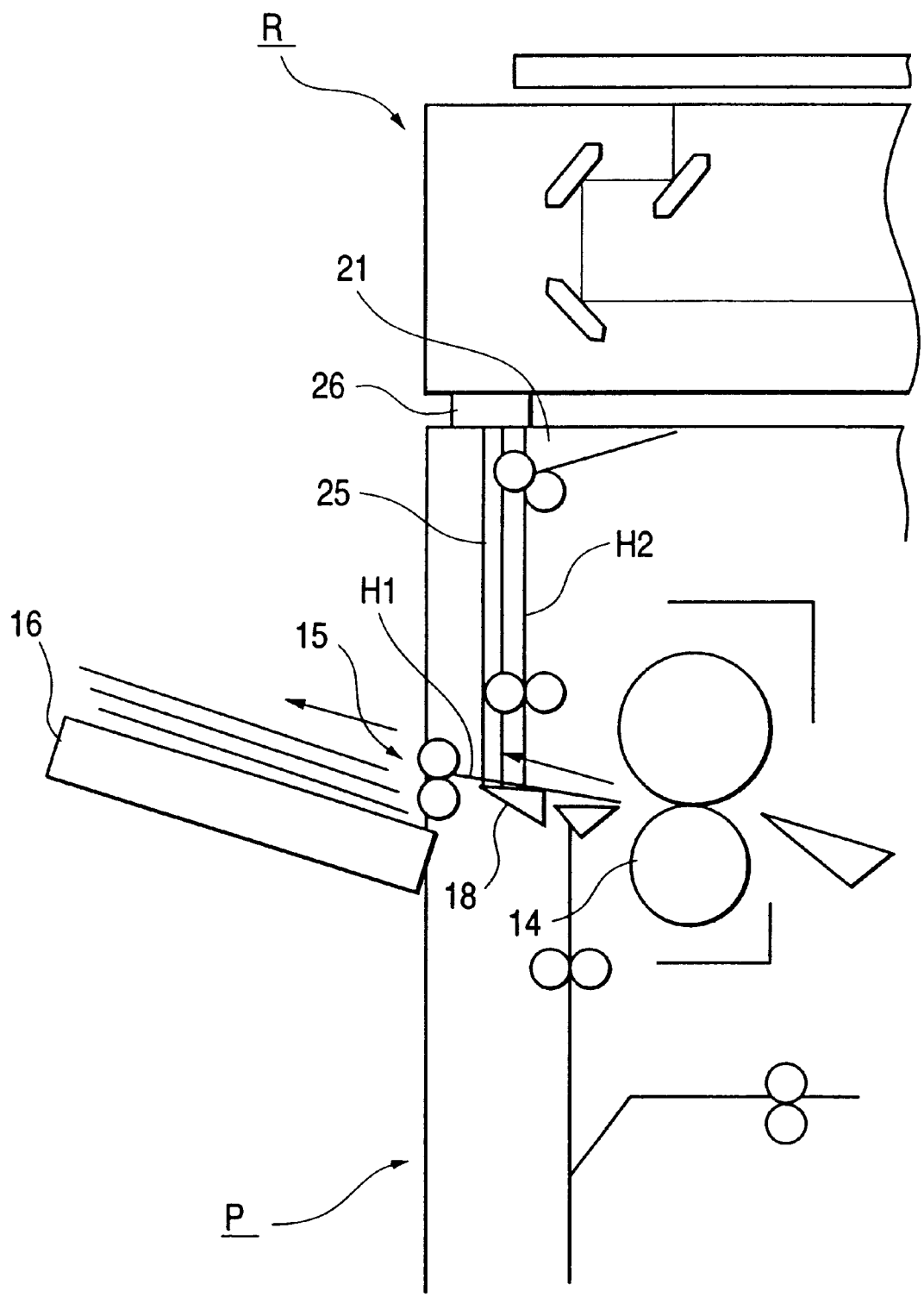
FIG. 3 illustrates an image forming apparatus with reading means according to a second embodiment of the present invention.

FIG. 3 shows a state in which the image reading portion R is installed at a predetermined position in the image forming portion P. The reference numeral 25 denotes engagement means engaged with the foot 26 of the image reading portion R and for changing over the changeover means 18 in its engaged state so as to direct a sheet to the sheet discharging portion 15.

Thereby, the sheet on which an image has been formed is conveyed to the sheet discharging portion 15 and is discharged onto the sheet discharging tray 16.

When at this time, the sheet is discharged straight, the sheet after image formation is discharged with its image bearing surface facing up.

Figure 4:
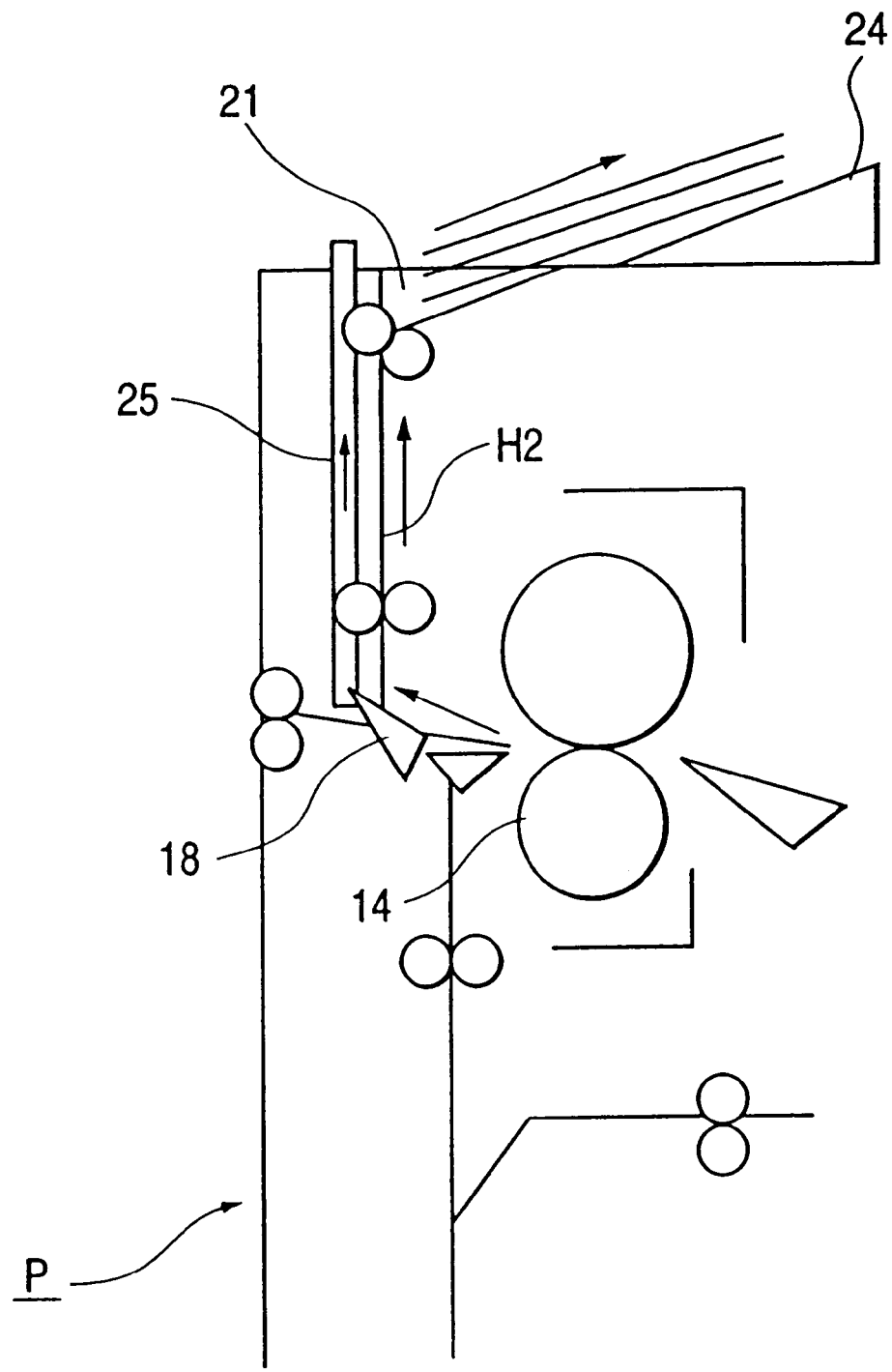
FIG. 4 illustrates the image forming apparatus according to the second embodiment of the present invention.

Next, FIG. 4 shows a state in which the image reading portion R has been removed from the predetermined position in the image forming portion P. At this time, the engagement means 25 is disengaged from the foot 26 of the image reading portion R, whereby the engagement means 25 is elevated and changes over the changeover means 18 to the conveying path H2, and the sheet is discharged from the sheet discharging portion 21 onto a newly provided sheet discharging tray 24.

At this time, the sheet after image formation is discharged with its image bearing surface facing down. The engagement means 25 is upwardly biased by a spring, not shown, and is connected to and operatively associated with the changeover means 18.

[Embodiment 3]

A third embodiment of the image forming apparatus to which the present invention is applied will now be described in detail with reference to the drawings. In the following description, structural elements similar to those in the first embodiment are given the same reference characters and need not be described.

Figure 5:
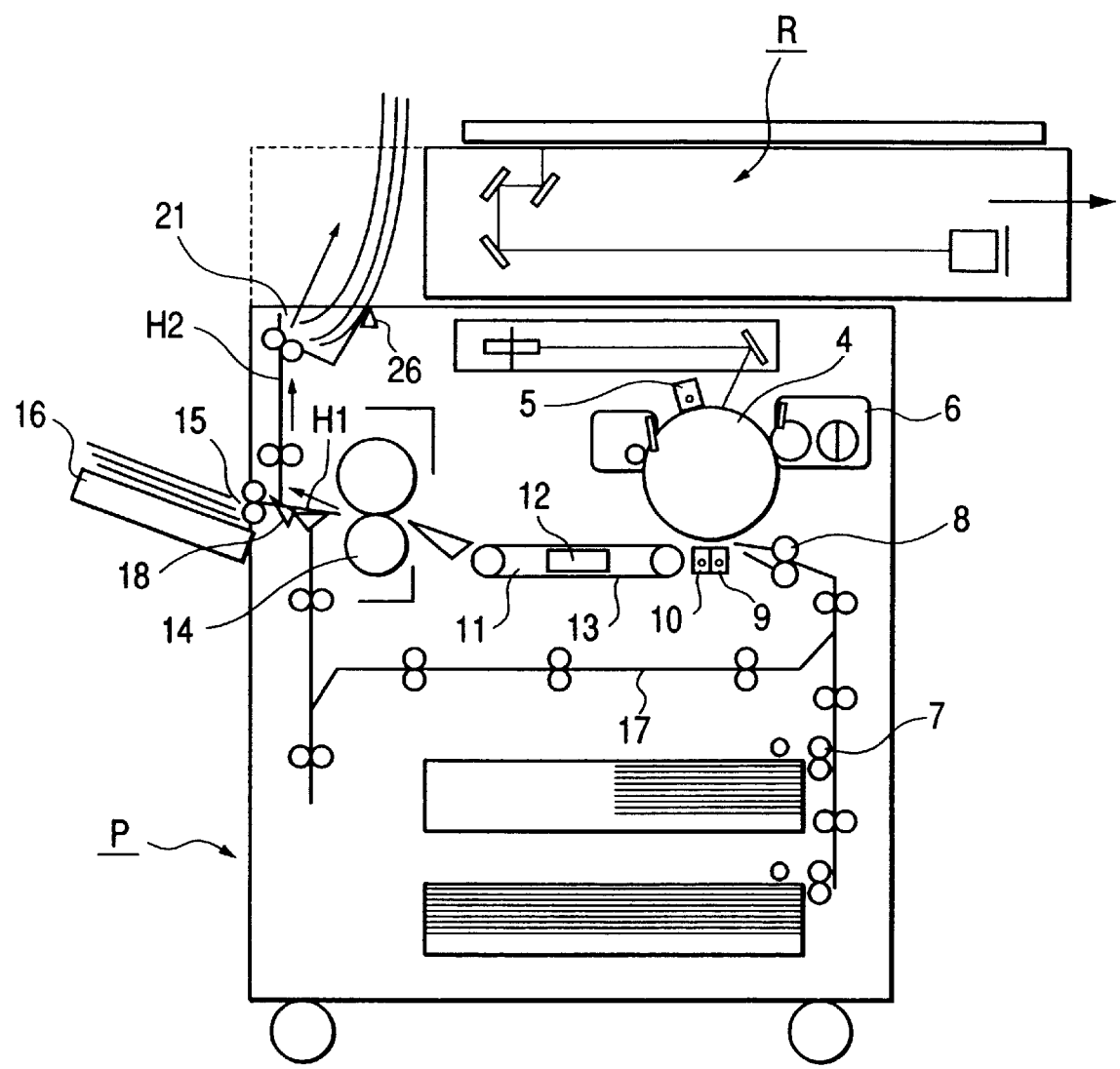
FIG. 5 illustrates an image forming apparatus according to a third embodiment of the present invention.

FIG. 5 shows a case where the image reading portion R has slid from a state (a first position) in which the image reading portion R is installed at a predetermined position in the image forming portion P to a second position.

The reference numeral 26 designates detecting means for detecting that the image reading portion R is in the first position (broken line position). The image reading portion R is in the first position and the detecting means 26 detects the image reading portion R, whereby the conveying path H1 is selected by the changeover means 18, and a sheet, on which an image has been formed, is conveyed to the sheet discharging portion 15 and is discharged onto the sheet discharging tray 16.

When conversely, the image reading portion R is in the second position (solid line position), the conveying path is changed over to the conveying path H2 by the changeover means 18, and the sheet is discharged from the discharging portion 21 to the upper portion of the image forming portion P.

The image reading portion R is guided onto the image forming portion P by a slide rail, not shown.

The aforedescribed detecting means 26 detects the position of the image reading portion R by a photosensor or the like, but it is not restricted thereto.

[Embodiment 4]

A fourth embodiment of the image forming apparatus to which the present invention is applied will now be described in detail with reference to the drawings. In the following description, structural elements similar to those in the first and second embodiments are given the same reference characters and need not be described.

Figure 6:
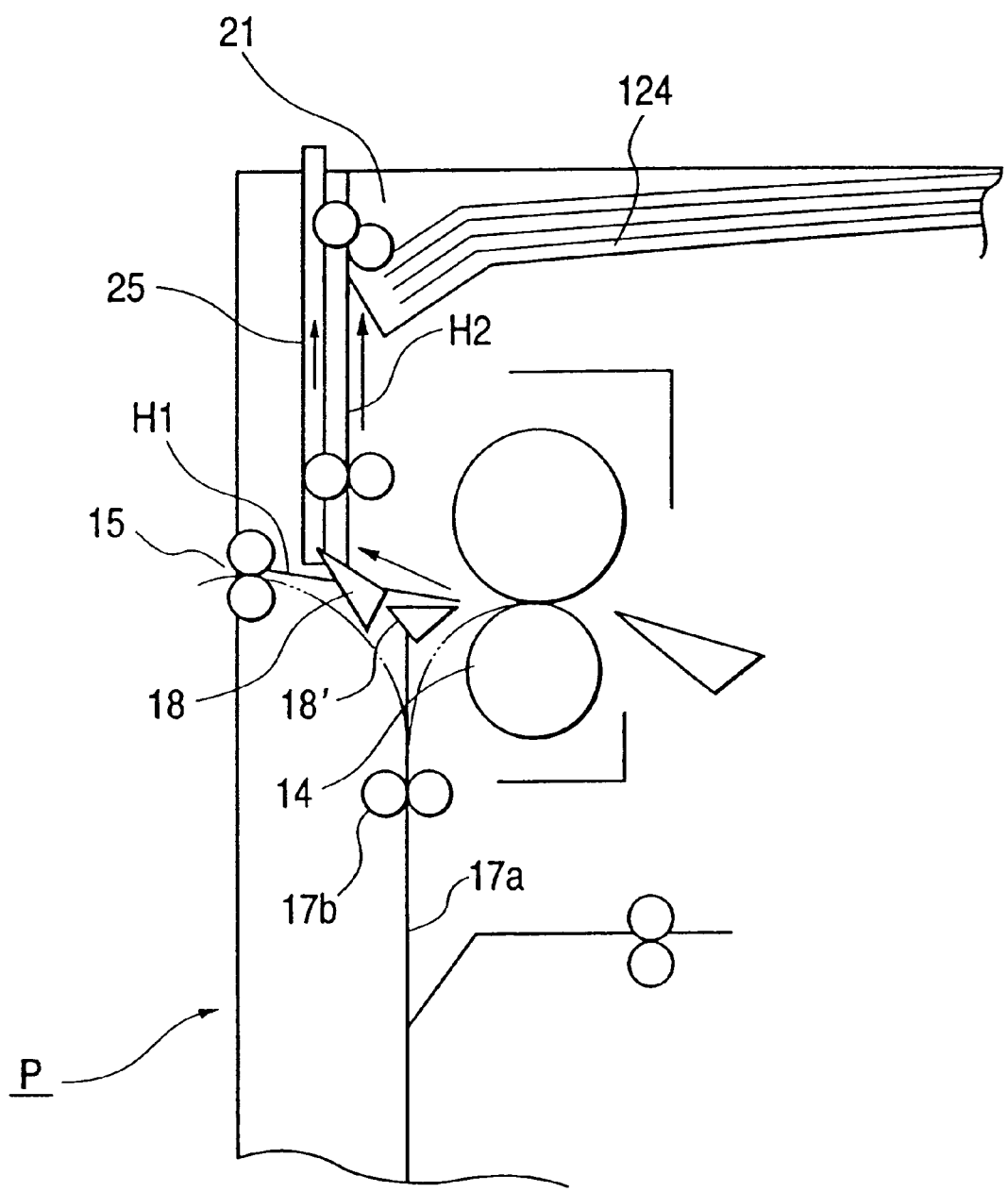
FIG. 6 illustrates an image forming apparatus according to a fourth embodiment of the present invention.

FIG. 6 shows a state in which the image reading portion R has been removed from a predetermined position in the image forming portion P. At this time, the engagement means 25 is disengaged from the foot 26 of the image reading portion R, whereby the engagement means 25 is elevated and changes over the changeover means 18 to the conveying path H2, and a sheet is discharged from the sheet discharging portion 21 to a sheet discharging tray 124 provided on the upper surface of the body.

At this time, the sheet after image formation is discharged with its image bearing surface facing down. The engagement means 25 is upwardly biased by a spring, not shown, and is connected to and operatively associated with the changeover means 18.

Also, the changeover means 18 can selectively changeover the conveying path H1 for conveying the sheet to the sheet discharging portion 15 and the conveying path H2 for conveying the sheet to the sheet discharging portion 21, i.e., a plurality of conveying paths. Accordingly, it can select face-down sheet discharging and face-up sheet discharging as desired. It is also possible to control changeover means 18' to thereby reverse (switch back) the front surface and the back surface of the sheet by the vertical conveying path portion 17a of the sheet refeeding conveyance path 17 (dots-and-dash line path) and discharge the sheet from the sheet discharging portion 15 with its face down. The reference character 17b designates a forwardly and reversely rotatable roller provided in the reverse switch-back path or vertical conveying path portion 17a.

Figure 7:
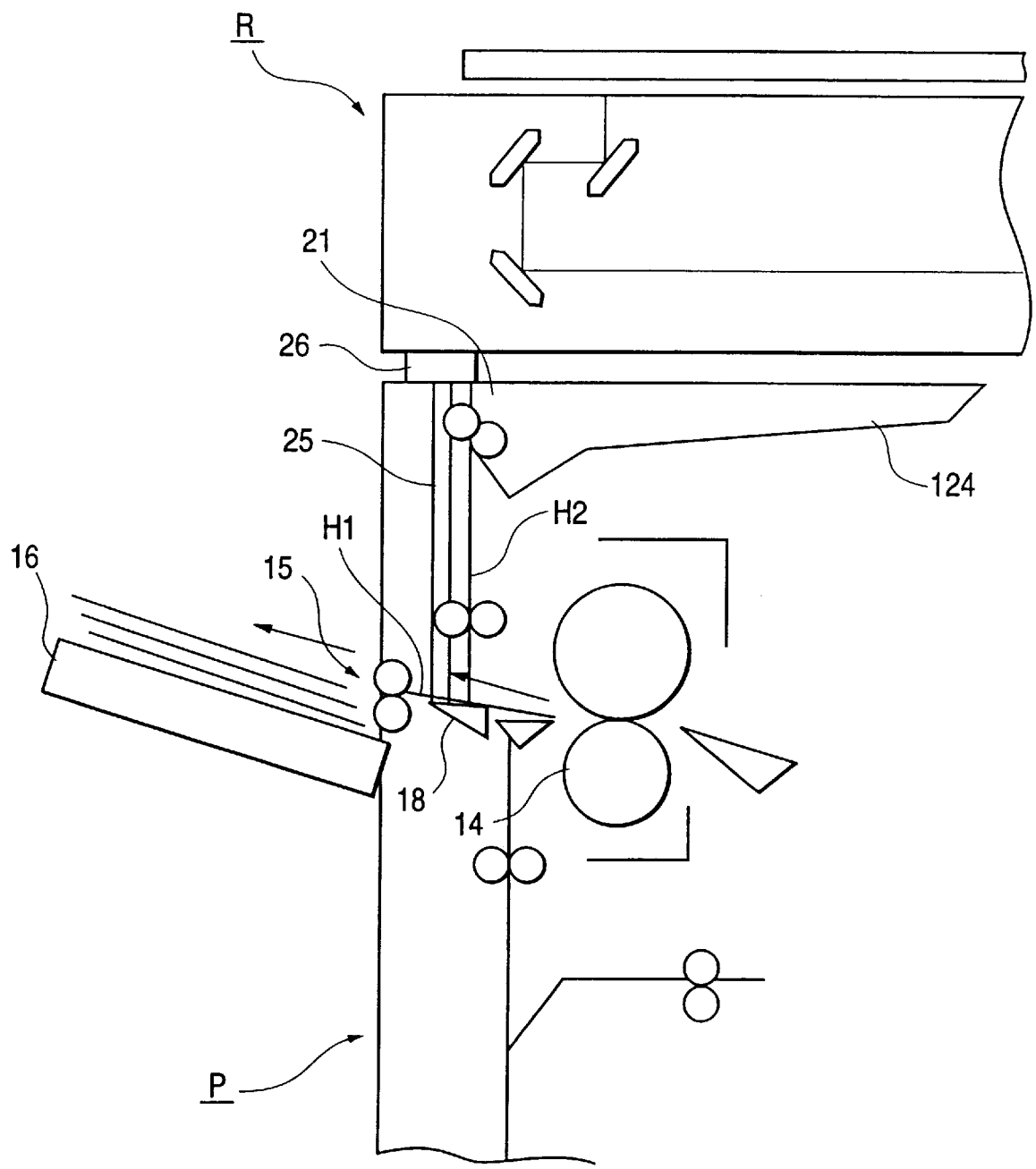
FIG. 7 illustrates the image forming apparatus with reading means according to the fourth embodiment of the present invention.
Figure 8:
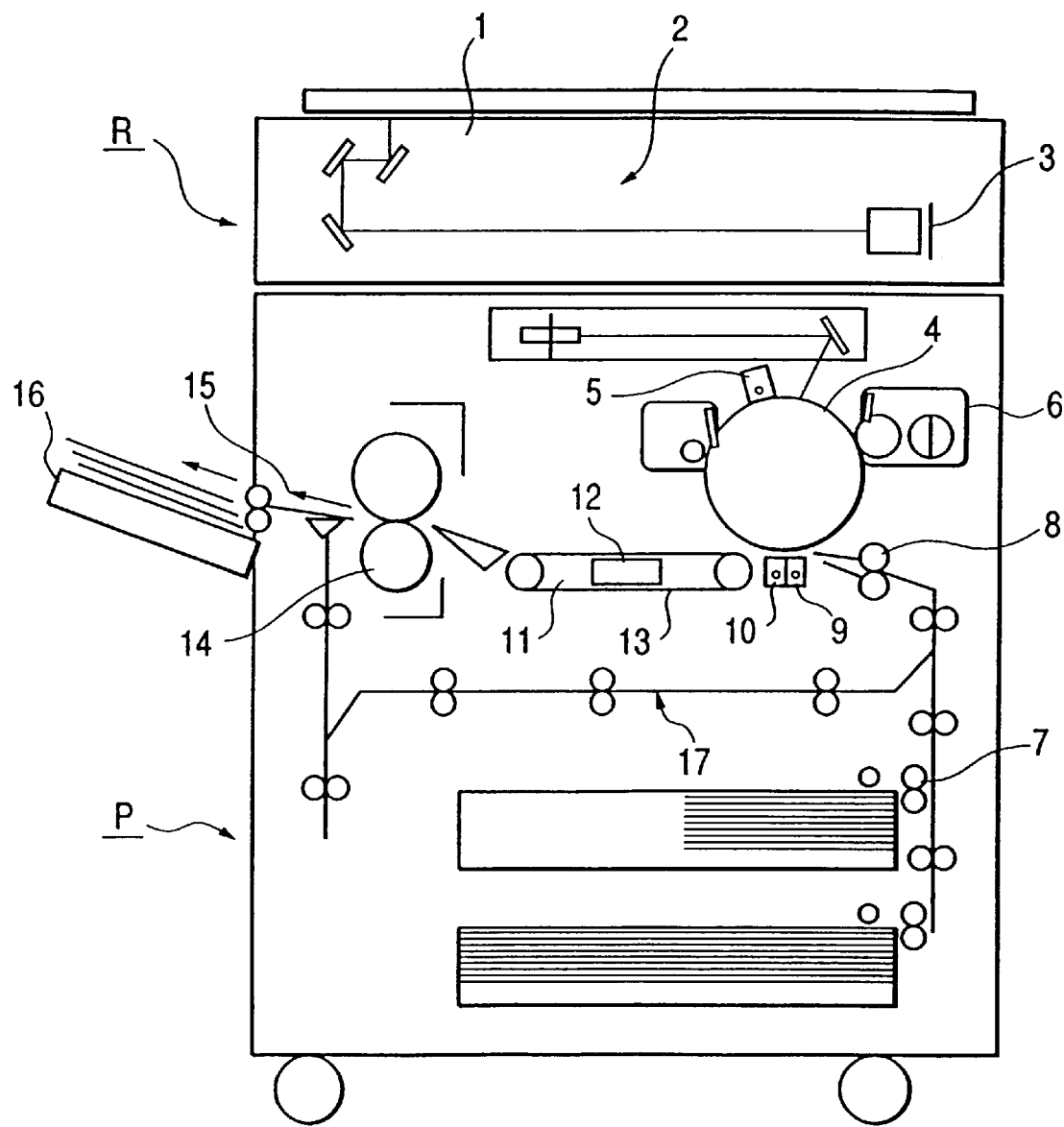
FIG. 8 illustrates an image forming apparatus according to the earlier technology.

FIG. 7 shows a state in which the image reading portion R is installed at a predetermined position in the image forming portion P. The reference numeral 25 denotes engagement means engaged with the foot 26 of the image reading portion R and for changing over the changeover means 18 in its engaged state so as to direct the sheet to the sheet discharging portion 15.

Thereby, the sheet on which an image has been formed is conveyed to the sheet discharging portion 15 and is discharged onto the sheet discharging tray 16.

When at this time, the sheet is discharged straight, the sheet after image formation is discharged with its image bearing surface facing up.

Even if the above-described solenoid is driven, the changeover means 18 is not changed over. Accordingly, malfunctioning is prevented.

What is claimed is:

1. An image forming apparatus including:
   sheet feeding means;
   image forming means for forming an image on a sheet;
   a plurality of conveying paths for directing the sheet on which the image has been formed to discharging portions;
   changeover means for selecting a desired conveying path from said plurality of conveying paths; and
   changeover controlling means for controlling said changeover means in conformity with whether reading means for reading the image of an original has been set at a predetermined position in a body of the apparatus.

2. An image forming apparatus according to claim 1, wherein when said reading means is set at said predetermined position, a conveying path through which the sheet is discharged with its face up is selected, and when said reading means is not set, a conveying path through which the sheet is discharged with its face down is selected.

3. An image forming apparatus according to claim 2, wherein the conveying path for discharging the sheet with its face down directs the sheet to an upper surface portion of the body of the apparatus, and the conveying path for discharging the sheet with its face up directs the sheet to a side portion of the body of the apparatus.

4. An image forming apparatus according to claim 3, wherein said reading means is removably mountable on said upper surface portion.

5. An image forming apparatus according to claim 4, wherein said changeover controlling means is a mechanical interlocking means for acting on said changeover means in conformity with a mounting of said reading means.

6. An image forming apparatus according to claim 4, wherein said changeover controlling means is a dynamo-electric means for acting on said changeover means in conformity with a mounting of said reading means.

7. An image forming apparatus according to claim 3, wherein said reading means is slidable relative to said predetermined position on said upper surface portion.

8. An image forming apparatus according to claim 7, wherein said changeover controlling means is a dynamo-electric means for acting on said changeover means in conformity with a sliding movement of said reading means.

9. An image forming apparatus according to claim 1, wherein said plurality of conveying paths comprises a first conveying path for directing the sheet to first containing means, and a second conveying path for directing the sheet to second containing means, and when said reading means is set at said predetermined position to cover said second containing means, said first conveying path is selected.

10. An image forming apparatus according to claim 9, wherein said second conveying path is a path curved upwardly toward an upper surface portion of the body of the apparatus, and said first conveying path is a path extending toward a side portion of the body of the apparatus.

11. An image forming apparatus according to claim 10, wherein said reading means is removably mountable on said upper surface portion.

12. An image forming apparatus according to claim 11, wherein said changeover controlling means is a mechanical interlocking means for acting on said changeover means in conformity with a mounting of said reading means.

13. An image forming apparatus according to claim 11, wherein said changeover controlling means is a dynamo-electric means for acting on said changeover means in conformity with a mounting of said reading means.

14. An image forming apparatus according to claim 10, wherein said reading means is slidable relative to said predetermined position on said upper surface portion.

15. An image forming apparatus according to claim 14, wherein said changeover controlling means is a dynamo-electric means for acting on said changeover means in conformity with a sliding movement of said reading means.

16. An image forming apparatus according to any one of claims 1 to 15, further comprising photosensitive means and electrostatic latent image forming means for applying a laser beam to said photosensitive means, wherein the laser beam is applied in response to an image electrical signal from the outside, and wherein, when said reading means is set, the laser beam is applied in response to the image electrical signal of the original read by said reading means.

17. An image forming apparatus according to any one of claims 1 to 15, wherein said image forming apparatus functions as a printer and discharges the sheet with its face down in a state in which said reading means is not set, and functions as a copying apparatus and discharges the sheet with its face up by said reading means being set.

* * * * *